Nov. 30, 1954   C. B. DE VLIEG   2,695,532
TRANSMISSION MECHANISM FOR MACHINE TOOLS
AND FOR GENERAL APPLICATION
Filed Feb. 11, 1952   8 Sheets-Sheet 1

Inventor
Charles B. De Vlieg
By McCanna & Morsbach
Attys.

Nov. 30, 1954  C. B. DE VLIEG  2,695,532
TRANSMISSION MECHANISM FOR MACHINE TOOLS
AND FOR GENERAL APPLICATION
Filed Feb. 11, 1952  8 Sheets-Sheet 3

Inventor
Charles B. DeVlieg
By McCanna & Morsbach
Attys.

Nov. 30, 1954

C. B. DE VLIEG 2,695,532

TRANSMISSION MECHANISM FOR MACHINE TOOLS
AND FOR GENERAL APPLICATION

Filed Feb. 11, 1952

Inventor
Charles B. De Vlieg
By McCanna & Morsbach
Attys.

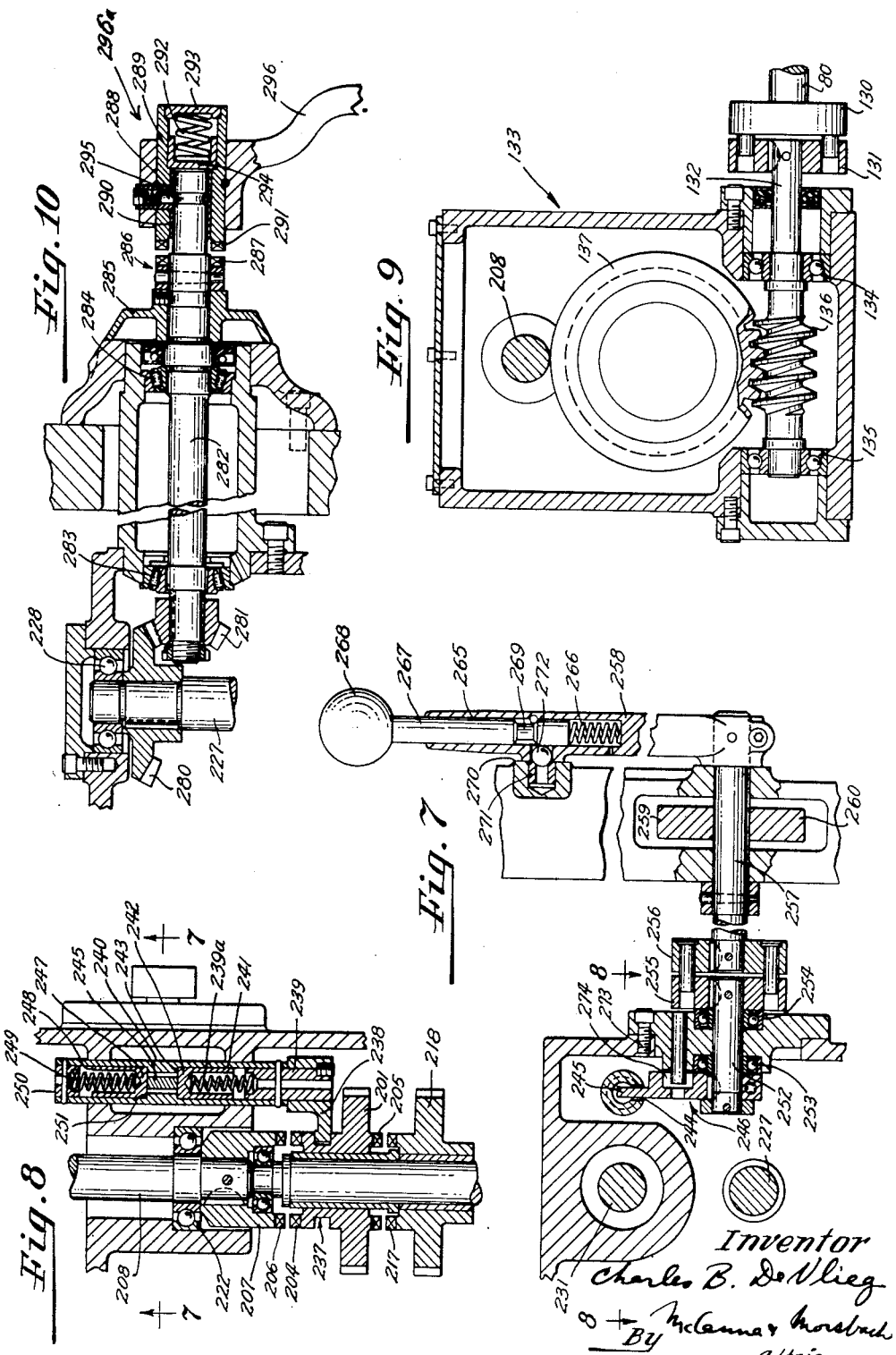

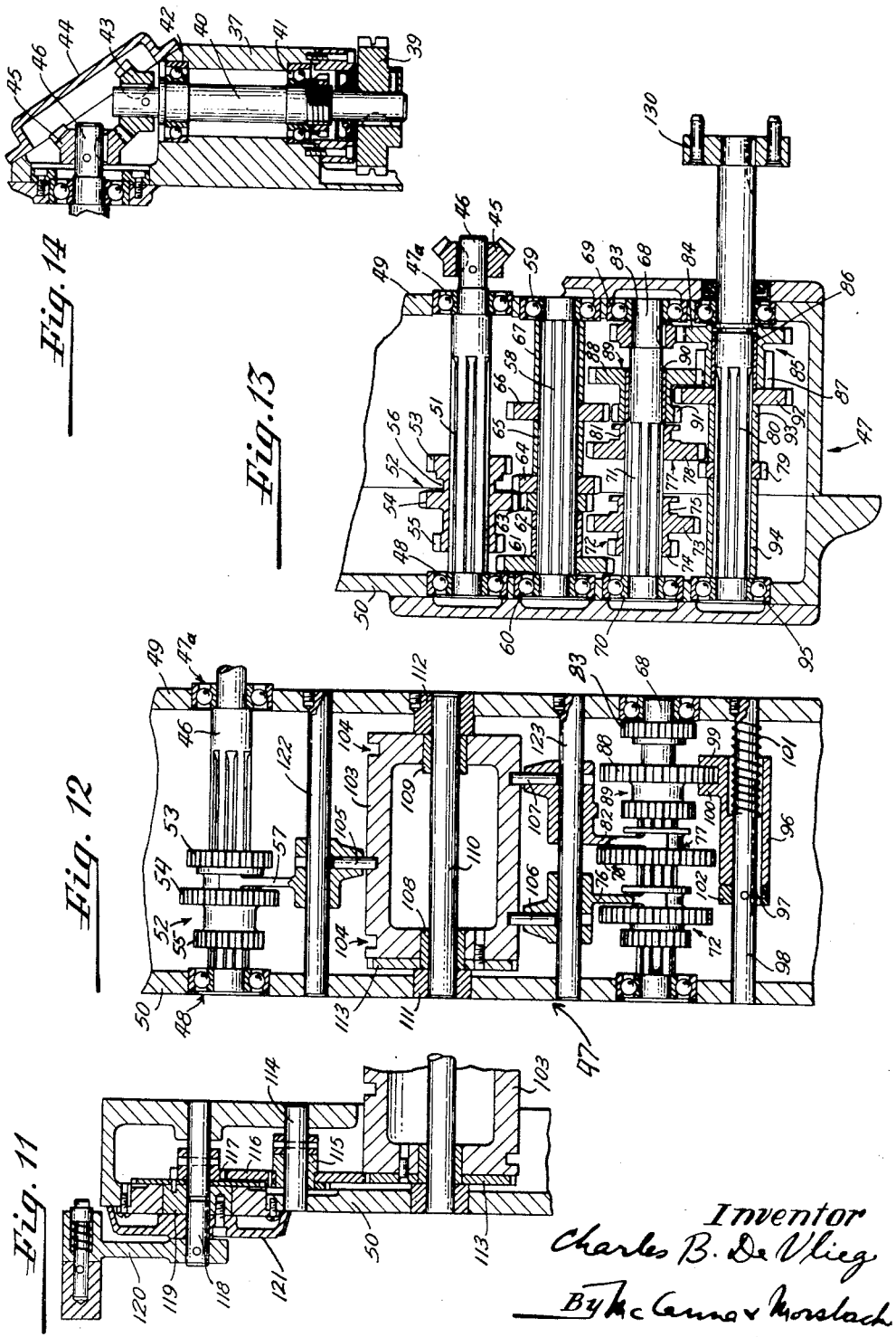

Nov. 30, 1954  C. B. DE VLIEG  2,695,532
TRANSMISSION MECHANISM FOR MACHINE TOOLS
AND FOR GENERAL APPLICATION
Filed Feb. 11, 1952  8 Sheets-Sheet 7
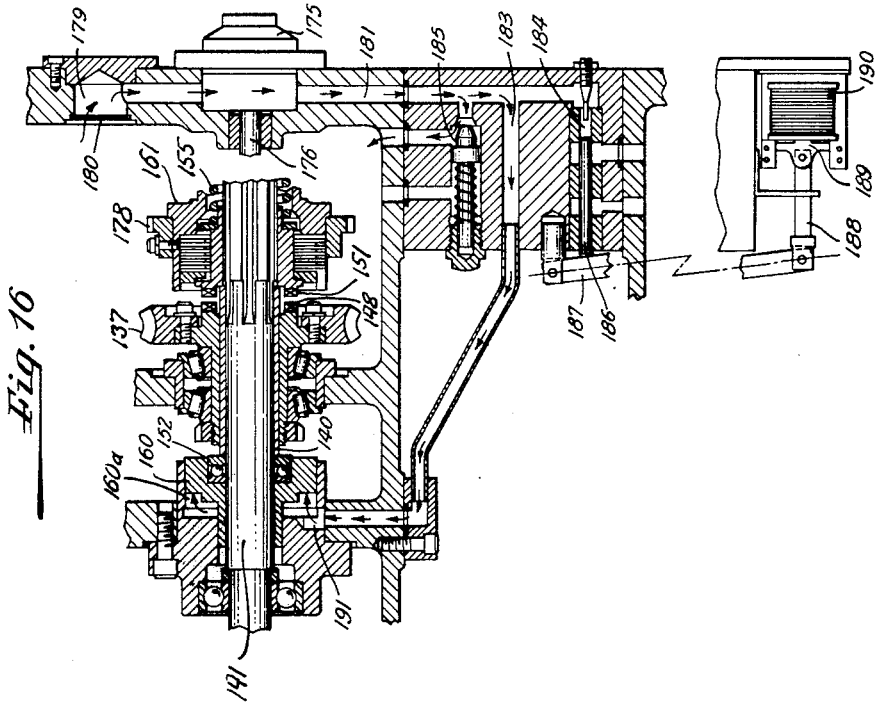
Inventor
Charles B. De Vlieg
By McCanna & Morsbach
Attys.

Nov. 30, 1954   C. B. DE VLIEG   2,695,532
TRANSMISSION MECHANISM FOR MACHINE TOOLS
AND FOR GENERAL APPLICATION
Filed Feb. 11, 1952   8 Sheets-Sheet 8

Inventor
Charles B. De Vlieg
By McCanna & Morsbach
Attys.

United States Patent Office 2,695,532
Patented Nov. 30, 1954

2,695,532

TRANSMISSION MECHANISM FOR MACHINE TOOLS AND FOR GENERAL APPLICATION

Charles B. De Vlieg, Farmington, Mich.

Application February 11, 1952, Serial No. 271,043

12 Claims. (Cl. 74—472)

This invention relates generally to transmission mechanism for machine tools and for general application.

The invention has more particular reference to such mechanism as is used in the machine tools designed for high precision milling and boring operations and also designed for a wide range of such operations for tool and die making and also for use in the production manufacture of work pieces usually of special and difficult precision requirements. Transmission mechanism of this character is disclosed in United States Patent No. 2,561,346, granted July 24, 1951, wherein such mechanism is designed for performing what might be termed three separate drive-transmitting functions namely, first, for moving either a tool head or a work-carrying saddle in feed movements such as are required in milling and boring operations, secondly, for moving either said tool head or work-carrying saddle in rapid traverse movements, and thirdly, for moving said tool head or work-carrying saddle in feed and rapid traverse ranges of speeds in response to precision control mechanism to accomplish what is described in said patent as automatic positioning of said tool head or work-carrying saddle.

The principal object of the present invention is to provide an improved transmission mechanism of the character described.

In furtherance of this general object my invention contemplates certain improvements designed to make for a higher degree of accuracy and precision in the operation and control functions of the kind described, and constructions for this purpose which are more durable and dependable to meet the severe work-a-day requirements of machine tools of this kind.

One of the objects is to provide an improved transmission mechanism having the functions described, coordinated in such novel manner as to enable the use of a single motor for driving in a simple and practicable manner the several transmission trains employed for obtaining the operating functions above described.

Another object is to provide a transmission mechanism of the character described wherein a high power feed transmitting drive is provided wherein shock to the system upon shifting from feed to the initial rapid traverse drive condition, thus producing a smoother and quieter operation less liable to inherent structure damage and the necessity of costly servicing and repairing.

Another object is the provision of improved transmission mechanism of the character described having a soft action clutch drive in the initial rapid traverse movement and having a positive jaw clutch drive in the feed movements.

Another object is the provision of improved transmission mechanism having control means for effectively bringing the mechanism to instant stop at the desired times, thereby promoting greater precision in the work performance of the machine. While this feature of my invention is utilized under both the manual control and the automatic positioning conditions above described, it is of special advantage when operating under manual control in that it avoids overrun or coasting at the end of the feed and rapid traverse movements and consequently avoids the dangers such as damage to tools, work pieces, and the machine itself.

Another object is to provide an improved transmission mechanism for general applications.

Another object is to provide an improved and simplified transmission mechanism of the character described, particularly with the view to economy in cost of manufacture considering the functions and features of such mechanism.

Other and further objects and advantages of the invention will be apparent from the following description of a preferred embodiment thereof.

In the drawings:

Fig. 7 is a section taken along the line 7—7 in Fig. 8 and showing the shifting mechanism for selectively coupling the drive from the motor to the lead screw for the work holder or to the lead screw for the tool holder in the transmission of Fig. 3;

Fig. 8 is a section taken along the line 8—8 in Fig. 7, showing further details of this shifting mechanism;

Fig. 9 is a section taken along the line 9—9 in Fig. 3 and showing the driving connection from the output of the speed reduction unit to the transmission of Fig. 3;

Fig. 10 is a section showing the driving connection from a hand crank to the transmission of Fig. 3 for manual feed of the work holder in the amanul positioning thereof;

Fig. 11 is a section showing a portion of the operating connection between a cam roller, the speed reduction unit of Figs. 4 and 5, and the handle for setting the desired output speed from this unit;

Fig. 12 illustrates the manner in which the cam roller of Fig. 11 controls a plurality of shiftable gears in the speed reduction unit of Figs. 4 and 5 for selectively driving the output shaft of the speed reduction unit from its input shaft at the desired speed;

Fig. 13 shows the driving connection between the input and output shafts of the speed reduction unit of Figs. 4 and 5;

Fig. 14 is a fragmentary sectional view showing a portion of the driving connection from the motor to the input shaft of the speed reduction unit;

Fig. 15 shows the hydraulic shifter for selectively driving the Fig. 3 transmission for rapid traverse or feed movement, with the transmission coupled for the feed movement;

Fig. 16 is a view similar to Fig. 15 but showing the transmission coupled for the rapid traverse movement;

Figure 1:
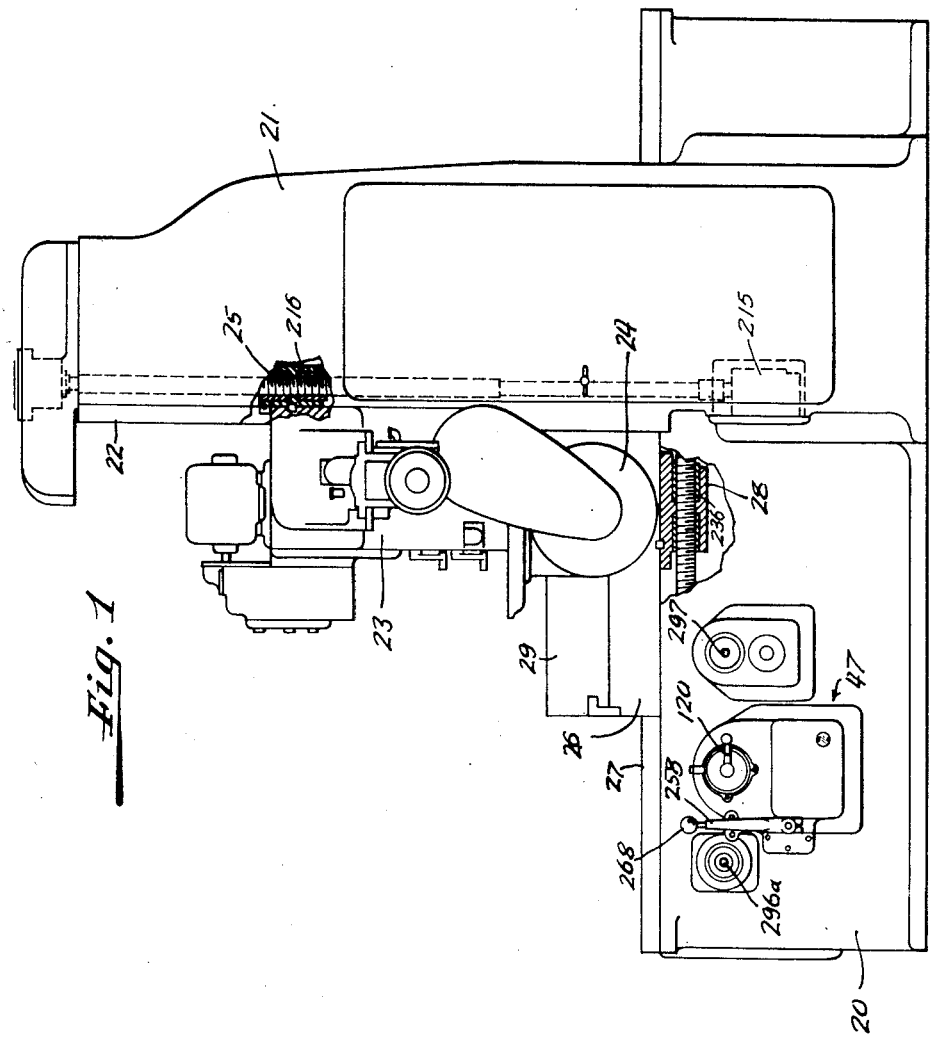
Figure 1 is a front elevational view, broken away in parts, of a machine tool embodying the feed unit of the present invention.

In the illustrated form of the invention, the machine tool to which the present invention is applied is of the type shown in United States Letters Patent No. 2,391,398 to Charles B. De Vlieg. The machine tool includes a horizontal bed 20 and a vertical column 21 which extends upward above the top of the bed 20 and is rigidly connected thereto. The column is provided with vertical ways 22 on which a spindle head 23 is mounted for vertical reciprocation for properly positioning the cutting tool. The driving motor for the tool holder is shown at 24. The rotary lead screw 216 coacts with a collar 25 attached to the spindle head 23 for effecting the desired vertical movement of the spindle saddle along column 21. The bed 20 is provided with horizontal ways 27 located at one side of the column 21 and extending lengthwise along the top of the bed. A saddle 26 is mounted for lengthwise reciprocation along the bed ways 27 for movement transversely of the column 21. A lead screw 236 coacts with a collar 28 attached to the saddle 26 for effecting the desired positioning of the saddle 26 relative to the tool holder carried by the spindle head 23. A work table or platen 29 for supporting the work piece is mounted on the saddle 26 for adjustment toward and away from the column 21, in the manner disclosed in more detail in the aforementioned patent.

The present invention is concerned with a novel mechanism especially designed for controlling the operation of the lead screws 216 and 236 for effecting the various movements and positioning of the tool holder and the work holder, respectively. The present invention may be desirably used with equipment incorporating the automatic positioning apparatus shown in United States Letters Patent No. 2,561,346 to Charles B. De Vlieg. It will be understood, however, that the present invention is applicable generally in the machine tool art and in other arts whenever its novel features are applicable.

In its broad outline, the present invention includes a single driving motor 31 adapted to be coupled selectively to either of the lead screws 216 and 236 for driving the latter, a transmission designated generally by 133 interposed between the driving motor and the lead screws and including a friction clutch for the high speed "rapid traverse" drive to a lead screw and a positive jaw clutch for the lower speed "feed" drive to a lead screw. The transmission 133 is preferably located within the bed 20. A shifting lever 258 having a hand knob 268 is provided for selectively coupling the transmission 133 to one or the other of the lead screws. A speed reduction unit designated generally by 47 is interposed between the driving motor and the transmission and controlled by an adjusting lever 120 for selecting the speed at which the lead screw is driven during the "feed" drive. A crank mechanism designated generally by 296a is provided for selectively operating the work holder manually during the final feed adjustment. A crank mechanism 297 is provided for selectively driving the tool holder manually.

Figure 2:
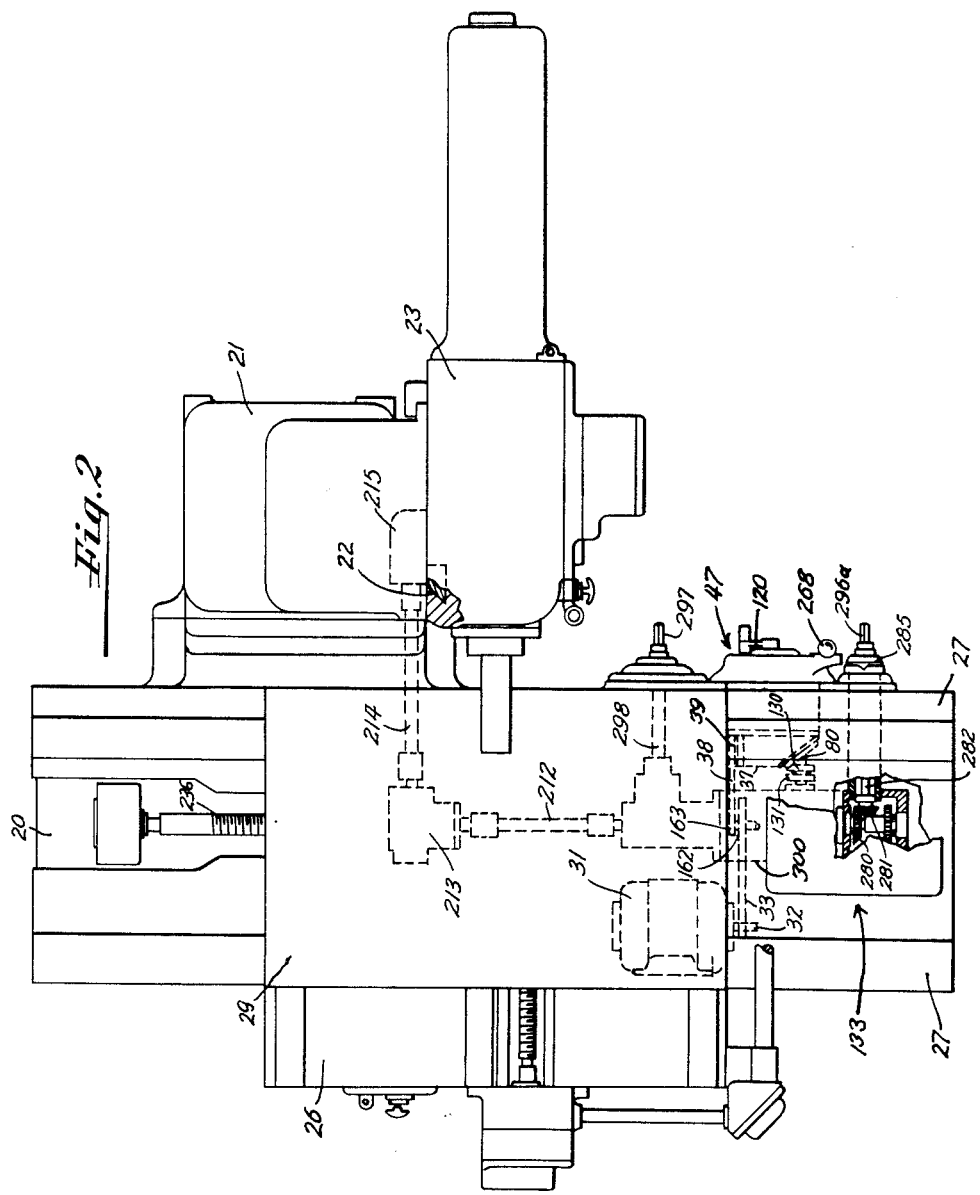
Fig. 2 is a top view, partly broken away, of the machine of Figure 1.
Figure 6:
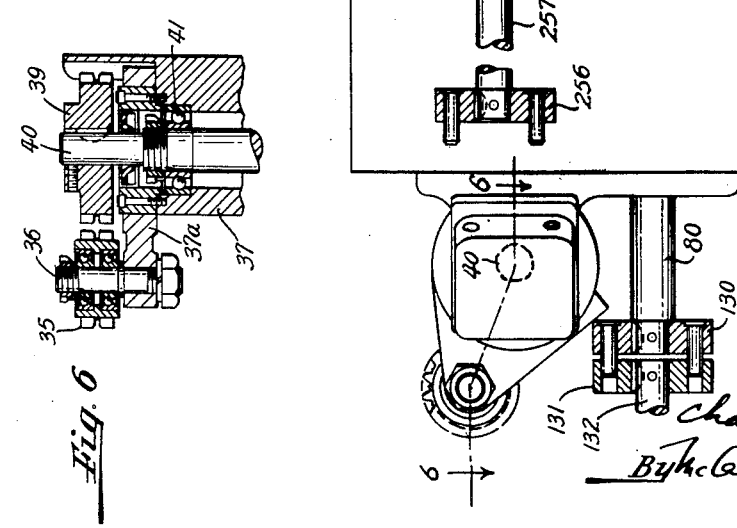
Fig. 6 is a fragmentary section along the line 6—6 of Fig. 4, illustrating the driving input to the speed reduction unit shown in Figs. 11 to 14 hereinafter described.

As best seen in Fig. 2, the driving motor 31 has its output shaft 32 connected by means of a sprocket and chain drive 33 to a large sprocket 162, which is mounted on the reduced end 34 of the rotary housing member 161 (Fig. 3), to be described in more detail hereinafter. A smaller pulley 163 is also mounted on the reduced end of housing member 161 to be thereby driven from the motor 31. The smaller pulley 163 is drivingly connected by a chain 38 (Fig. 2) to the sprocket 39. A chain tightener in the form of an idler sprocket 35 (Fig. 6) rotatably mounted on the stationary shaft 36, which is carried by the bracket 37a mounted on the hollow housing portion 37, is provided for adjusting the tension on the chain 38. Sprocket 39 is keyed to the shaft 40 which extends through the hollow housing portion 37, being suitably supported therein for rotation by spaced ball bearing assemblies 41 and 42 (Fig. 14). At its opposite end, the shaft 40 carries a bevel gear 43 disposed within the chamber enclosed by the end cap 44. The bevel gear 43 is keyed to the shaft 40 and meshes with a bevel gear 45 keyed to the shaft 46 at one end thereof.

*Speed reduction unit*

Shaft 46 is the input power shaft for the speed reduction unit, designated generally as 47. Referring to Fig. 13, the input shaft 46 is suitably journaled for rotation by the spaced ball bearing assemblies 47a and 48, which are respectively mounted in the end walls 49 and 50 of the speed reduction unit. Intermediate its length the input shaft 46 is splined longitudinally, at 51, and carries a multiple gear unit 52 thereat, which is splined to the shaft 46 to rotate therewith and to be adjustable along the length thereof. The gear unit 52 includes three axially spaced gears 53, 54 and 55 of different diameters. Between the gears 53 and 54 the gear unit 52 is formed with a reduced neck portion 56 for the reception of a shifting fork 57 (Fig. 12), by means of which the gear unit may be shifted along the drive shaft 46, as described hereinafter.

Adjacent to the drive shaft 46 there is positioned a splined idler shaft 58 (Fig. 13) journaled for rotation by the ball bearing assemblies 59, 60 between the end walls 49, 50 of the speed reduction unit. Splined to the shaft 58 is a first gear 61, which is located axially along the shaft 58 in abutment against the ball bearing assembly 60 and at its other axial face abutting against the sleeve 62. A second gear 63 is splined to the idler shaft 59, abutting against the other end of the sleeve 62. A third gear 64 is splined to shaft 58 and is located axially thereon between the other axial face of the second gear 63 and one end of the sleeve 65. A fourth gear 66 is also splined to shaft 58 and is located axially thereon between the other end of sleeve 65 and the inner end of sleeve 67, which has its outer end abutting against the ball bearing assembly 69. Depending upon the position of the gear unit 52 along input power shaft 46, the first gear 61 on idler shaft 58 may be in mesh with the driving gear member 55 to drive the shaft 58 at a first speed, or the third gear 64 may be in mesh with driving gear member 54 to drive the shaft 58 at a second speed, or the fourth gear 66 may be in mesh with the driving gear member 53 to drive the shaft 58 at a third speed, or the gear unit 52 may be in its neutral position and have no driving connection to the shaft 58.

Adjacent to the idler shaft 58 there is positioned a driven shaft 68 journaled for rotation by the ball bearing assemblies 69, 70 between the end walls 49, 50 of the change gear box. For a portion of its extent, at 71, the shaft 68 is splined longitudinally. A first gear unit 72 is splined to the shaft 68 to be slidable axially thereon and carries a pair of gear members 73 and 74 of different diameters, adapted, depending upon the position of the gear unit 72 along the shaft 68, to mesh respectively with the gears 63 and 61 mounted on the idler shaft 58. The gear unit 72 is formed with a reduced neck portion 75 for the reception of a shifting fork 76 (Fig. 12). A second gear unit 77 is also splined to the shaft 68 and carries a gear 78, adapted to mesh with the gear 79, which is splined to the output shaft 80. The gear unit 77 is formed with a reduced neck portion 81 for receiving another shifting fork 82 (Fig. 12). When the gear unit 77 is positioned to drive gear 79, the high speed drive for the output shaft 80 is thereby established.

Adjacent to the ball bearing assembly 69 a gear 83 is keyed to the driven shaft 68. The gear 83 is in constant mesh with a first gear 84 formed on the gear unit 85, which is rotatably mounted on the output shaft 80 by means of a cylindrical bearing bushing 86. The gear unit 85 also carries a second gear member 87 which has a relatively wide gear face. This second gear 87 is in constant mesh with a first gear 88 formed on the gear unit 89, which is rotatably mounted on the driven shaft 68 by means of a cylindrical bearing bushing 90. The gear unit 89 also has a second gear member 91 adapted, depending upon the axial position of the gear unit 89 along the driven shaft 68, to mesh with the gear 92, which is splined to the output shaft 80 and fixedly positioned axially therealong between the sleeve 93 and an adjacent axial end of the gear unit 85. (The gear 79 is similarly fixedly located axially along the output shaft 80 between the other end of the sleeve 93 and the inner end of a sleeve 94, whose outer end abuts against a ball bearing assembly 95 for the output shaft 80 in the end wall 50). From the foregoing it will be seen that a driving connection is established from the shaft 68 to the gear unit 89 carried thereon through gear 83 keyed to shaft 68, gear member 84 of the gear unit 85 mounted on output shaft 80, gear member 87 of the gear unit 85, and gear member 88 of the gear unit 89. When the gear unit 89 is shifted axially to the right in Fig. 13 from its neutral position, the gear member 91 moves into mesh with the gear member 92 to thereby establish the low speed drive connection from the shaft 68 to the output shaft 80. It is to be noted that when the gear unit 89 is thus shifted to the right in Fig. 13, the gears 88 and 87 remain in mesh because of the width of the latter, to maintain the driving connection from the shaft 68 to the gear unit 89.

The axial position of the gear unit 89 along the shaft 68 is controlled by a shifter 96 (Fig. 12) which is keyed at 97 to the stationary shaft 98 for limited sliding movement longitudinally thereon. The shifter 96 is bifurcated at 99, 100 to rather snugly engage the gear member 88 at the opposite axial faces thereon, without interfering with the rotation of the gear member 88. The stationary shaft 98 on which the shifter is mounted extends between the end walls 49, 50 of the change gear box, and a compression coil spring 101 acts between the end wall 49 and the shifter 96 to urge the latter to a predetermined position axially along the shaft 98, which position is defined by the collar 102 fixed to the shaft 98 and against which the opposite end of the shifter 96 abuts. In this normal position of the shifter 96, the gear unit 89 is maintained in its neutral position, shown in Fig. 13, having no driving connection to the output shaft 80.

For controlling the respective positions of all of the gear shifters 57, 76, 82 and 96 (Fig. 12), to thereby selectively control the speed of the output shaft 80, there is provided a rotatably mounted cam roller 103 having a plurality of cam groove portions 104 formed in its cylindrical periphery. Pins 105, 106, and 107 are carried respectively by the shifters 57, 76 and 82 and ride in the cam grooves, so that the angular position of the cam roller determines the axial positions of these shifters along the respective fixed shafts 122 and 123 on which they are slidably mounted, and thus controls the axial positions of the corresponding gear units 52, 72 and 77 along their respective shafts. A suitable linkage (not shown) is provided between a groove in the cam roller 103 and the shifter 96, for displacing the shifter 96 from its normal position at predetermined angular positions of the cam roller, in order to shift the gear unit 89 from its neutral position to bring the gear member 91 thereon into mesh with the gear 92 on output shaft 80.

The cam grooves in roller 103 are such that the gear unit 77 is shifted into mesh with output gear 79 alternately with the shifting of gear unit 89 into mesh with the other output gear 82. Obviously, the foregoing selective gear arrangement provides twelve different speeds of the output shaft 80 for a given speed of the input shaft 46.

The cam roller 103 is rotatably mounted on bushings 108 and 109 which are carried on a stationary shaft 110 carried in the spaced end sleeves 111, 112, which are mounted respectively in the end walls 50 and 49 of the change gear box. At its inner end the sleeve 112 abuts against one end of the cam roller 103. A gear 113 is attached to the opposite end of the cam roller 103 and abuts against the inner end of the sleeve 111. Adjacent the cam roller shaft 110 there is positioned a stationary idler shaft 114 (Fig. 11) on which is mounted a bearing bushing 115. An idler gear 116 is rotatably mounted on the bushing 115 and is in mesh with the cam roller gear 113. The idler gear 116 also is in mesh with a driving gear 117 carried on the shaft 118 to rotate therewith. The shaft 118 extends through the bushing 119 and beyond the front wall 50 of the speed reduction unit 47 and carries a lever 120 thereat. A twelve-sided index plate 121 is mounted on the front wall 50 of the gear box (Fig. 11 and Fig. 5) to form a convenient means for indexing the angular position of the handle 120.

With the foregoing mechanism, the speed of the output shaft 80 is selectively controlled by angularly adjusting the handle 120. The handle, through gears 117, 116 and 113, controls the angular position of the cam roller 103, which, in turn, controls the meshing of the gears in the gear train between the input shaft 46 and an output shaft 80.

Transmission to the lead screws

Figure 3:
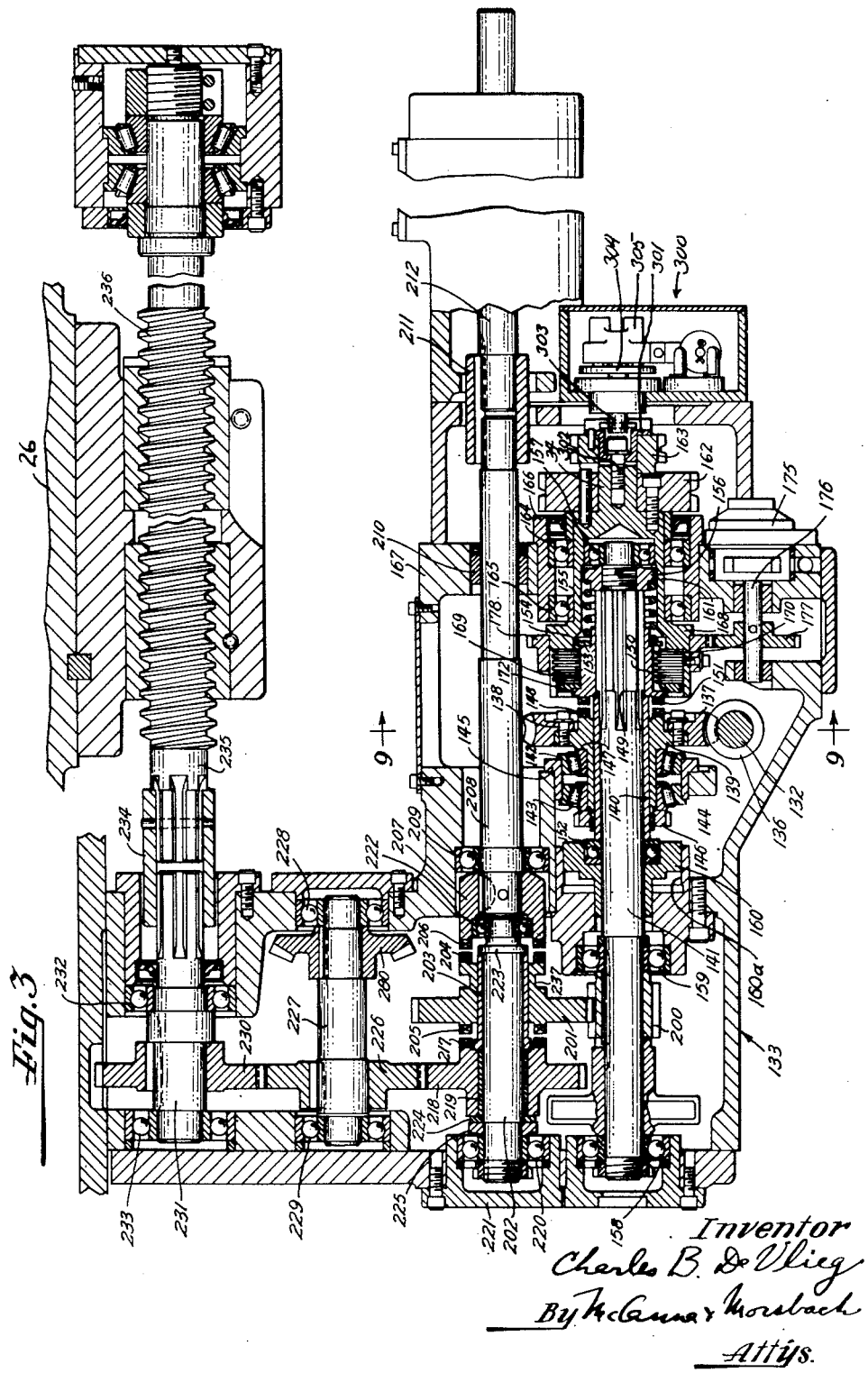
Fig. 3 is a section showing the driving transmission to the lead screws for the work holder and the tool holder, respectively.
Figure 4:
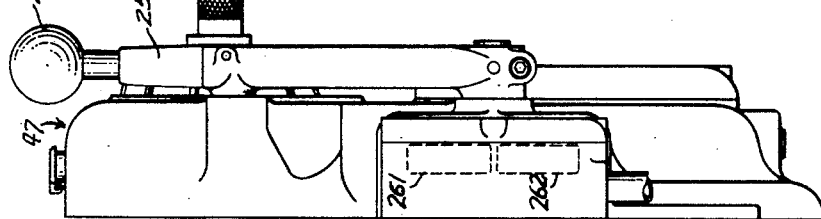
Fig. 4 is an end view of the housing for the speed reduction unit which provides a driving connection between the motor and the transmission of Fig. 3 for the slow feed movement of the tool or work holder.

The output shaft 80 from the speed reduction unit 47 carries a coupling 130 (Fig. 13) which engages a coupling 131 keyed to the shaft 132 (Figs. 2, 4 and 9). Shaft 132 is the input shaft to the transmission, indicated generally at 133 (Figs. 3 and 9).

As best seen in Fig. 9, the input shaft 132 is rotatably supported by means of spaced ball bearing assemblies 134 and 135. Intermediate its extent the input shaft 132 carries a worm 136 which meshes with a gear 137 to drive the latter. From Fig. 3 it will be seen that the gear 137 is attached by screws 138 to a clutch sleeve member 139. The clutch sleeve 139 is rotatably mounted on roller bearing assemblies 142 and 143 in a position concentric with the center shaft 141 of the transmission unit. A bushing 140 is interposed between the shaft 141 and the clutch sleeve member 139 and serves a function described later. These roller bearing assemblies are carried in a retainer 145 which in turn is carried by a transverse wall 144. A nut 146 threaded onto one end of the clutch sleeve 139 abuts against one end of the ball bearing assembly 143 to locate the latter axially, while the opposite end of the other ball bearing assembly 142 abuts against an internal shoulder 147 formed at the portion on the clutch sleeve 139 where the gear member 137 is mounted. At its axial end remote from the nut 146 the clutch sleeve 139 is formed with a clutch face having clutch teeth 148.

The shaft 141 is externally splined for a portion of its length, at 149, and a clutch sleeve member 150 is splined thereat to shaft 141 to be slidable axially therealong and to rotate therewith. At one axial end the clutch member 150 is formed with a clutch face having clutch teeth 151 for engagement with the clutch teeth 148 on the other clutch sleeve member 139. It is to be noted that bushing 140 at one end abuts against the ball bearing assembly 152 and at its other end abuts against the axial end of the clutch sleeve 150 at which the clutch teeth 151 are located, for a purpose which will be apparent hereinafter. Toward its other axial end the clutch sleeve 150 is formed with an external shoulder 153 at which the annular disk 154 is located. A compression coil spring 155 at one of its ends abuts against the disk 154 and at its other end bears against the nut 156 attached to shaft 141. The coil spring 155 resiliently biases the clutch sleeve 150 toward the clutch sleeve 139. Shaft 141 is mounted for rotation in the ball bearing assemblies 157 and 158 at its opposite ends, and intermediate its length is rotatably supported by the ball bearing assembly 159. The ball bearing assembly 152 is carried in a piston 160 which is slidable in a cylinder 160a which in turn is bolted to the transmission casing.

The end bearing assembly 157 for shaft 141 is mounted toward the closed end of an axial passage formed in the irregularly shaped housing body 161, which at its closed end 34, of reduced size, carries sprockets 162 and 163, independent of the speed reduction unit 47, as described. The housing body 161 is rotatably mounted by spaced ball bearing assemblies 164 and 165 in the tubular sleeve 166 carried by an intermediate transverse wall 167 of the casing for the transmission 133. As shown in Fig. 3, the housing body 161 extends around the coil spring 155 and the clutch sleeve 150, whose clutch face is biased by spring 155 to a position just beyond the open end of housing body 161. Toward its open end the housing body 161 is formed with an enlarged tubular portion 168 at which is formed an enlarged passage for the reception of an annular assembly 169 of friction disks, of conventional design. The friction disk clutch assembly 169 includes alternate disks movable in unison with the housing body 161 and adjacent alternate disks movable in unison with the clutch sleeve 150.

In the operation of the described clutch arrangement, the shaft 141 may be driven for "rapid traverse" through the sprocket 162, direct from the motor 31 and through disc clutch 169. Alternatively, the shaft 141 may be driven at a much slower speed for "feed" direct from the motor 31 and through the speed reduction unit 47 and the input shaft 132, worm gear 137, and jaw clutch 150.

For actuating the described clutch arrangement between its "rapid traverse" and "feed" positions there is provided the hydraulic system shown in Figs. 15 and 16. This hydraulic system includes a conventional constant direction rotary pump 175 having its impeller mounted on a shaft 176 which carries a gear 177 (Fig. 3) meshing with an external gear 178 carried on the housing body 161. In this way, rotation of the housing body 161 effects rotation of the impeller of pump 175.

The hydraulic system includes an inlet passage 179 from the oil reservoir, provided with a filter 180. This inlet passage communicates with the inlet to the pump impeller, which discharges oil under pressure to the outlet passage 181. The outlet passage 181 leads to three alternate passages 182, 183 and 184. The passage 182 which leads back to the oil reservoir, is normally closed by a spring pressed relief valve 185. The passage 184 also leads back to the oil reservoir and may be closed by a reciprocable valve member 186. The latter is under the control of a lever arm 187 which is pivoted to a stem 188 attached to the armature 189 of a solenoid 190. Thus, when the solenoid is de-energized (Fig. 15), the armature 189 is positioned to locate the lever arm 187 so as to permit the valve member 186 to retract under the pressure of the oil, so as to effect communication between the passage 184 and the oil reservoir. When the solenoid is energized (Fig. 16), the solenoid coil draws the armature 189 inward and causes the lever arm 187 to push the valve member 186 to a position blocking the flow of oil through passage 184 to the reservoir.

The other passage 183 leads to an inlet 191 at the back side of the sleeve 160, which together with the ball bearing assembly 152 and the bushing 140 is slidable along shaft 141. Normally, the coil spring 155, acting through the clutch sleeve 150 which abuts against one end of bushing 140, biases the slidable assembly of sleeve 160, ball bearings 152 and bushing 140 to the left along shaft 141 in Figs. 3, 15 and 16. When valve 186 is in its retracted position, there is no substantial oil pressure acting against the opposite end of this slidable assembly to overcome this spring bias. However, when valve 186 is closed (Fig. 16) oil under pressure flows through passage 183 into the inlet 191 and exerts a force against the sleeve 160 to slide the assembly of sleeve 160, ball bearings 152 and bushing 140 to the right in Figs. 3, 15 and 16, overcoming the bias of coil spring 155. Any excess oil pressure at this time is relieved by the relief valve 185, which when open permits oil to flow through conduit 182 back to the oil reservoir.

To establish the slow "feed" drive to the shaft 141, the solenoid 190 is kept de-energized so that there is no oil pressure behind the sleeve 160 (Fig. 15). The coil spring 155 biases the clutch member 150 into engagement with the clutch member 139, and there is established a driving connection from shaft 132 leading from the speed reduction unit 47, through worm 136, gear 137, and engaging clutch members 139 and 150 to the shaft 141, to which the clutch member 150 is splined. It will be noted that the clutch members 139 and 150 form a "hard," positive jaw clutch between shaft 141 and the motive source during the low speed, "feed" rotation of shaft 141. This positive jaw clutch provides a positive and accurate drive for the feed rates transmitted to the saddle or the tool holder.

To establish the "rapid traverse" drive to the shaft 141, the solenoid 190 is energized to close valve 186 and thereby cause oil pressure behind the sleeve 160. The resulting movement of bushing 140, to the right in Fig. 16, causes the clutch sleeve 150 to be moved out of engagement with the clutch sleeve 139. This movement of the clutch sleeve 150 causes the friction clutch 169 to establish a friction drive between the housing body 161 and the clutch sleeve 150. This establishes a driving connection from the motor 31 through pulley 162, housing member 161, friction clutch 169, and clutch sleeve 150 to the shaft 141. It will be noted that the friction clutch 169 provides a "soft" clutch between shaft 141 and the motive source for the high speed, "rapid traverse" rotation of shaft 141. This "soft" clutch prevents shock to the transmission in the initial high speed movement of the saddle or the tool holder.

The energization and de-energization of solenoid 190 is under the control of manually operated push buttons or by limit switches (not shown) which may be arranged in accordance with the teaching of the above-mentioned Patent No. 2,561,346. These limit switches are actuated in response to the position of the work holder being positioned for establishing the desired clutch to the transmission to the appropriate lead screw.

Instantaneous stopping

The present invention incorporates mechanism, indicated generally at 300 in Fig. 3, for stopping the driving motor 31 and the transmission shaft 141 substantially instantaneously when the driving motor is de-energized.

Figure 17:
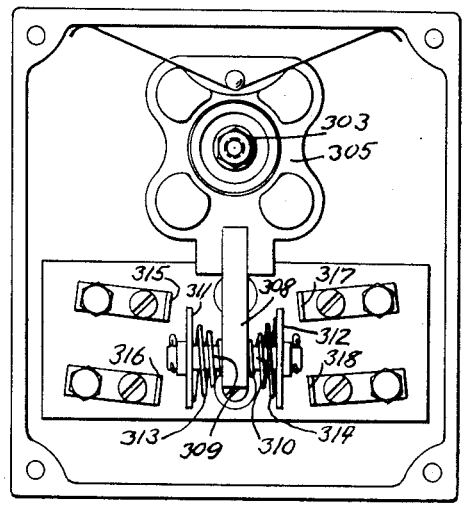
Fig. 17 is a front view of a plugger switch frictionally coupled to the drive from the driving motor to the transmission of Fig. 3 for instantaneously stopping the drive when the driving motor is de-energized.
Figure 18:
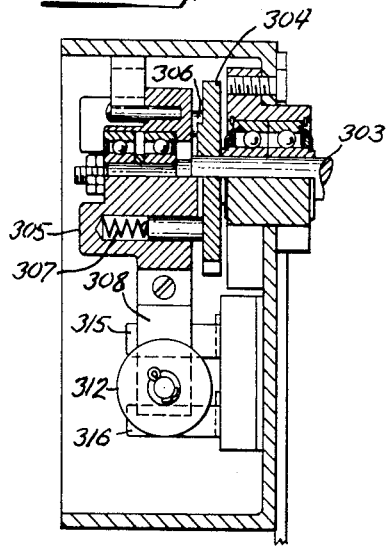
Fig. 18 is a transverse view, partly in section of the Fig. 17 device.

As shown in Fig. 3, an attachment member 301 is attached to the pulley 163, and, by means of a threaded bolt 302, to the reduced end 34 of the housing body 161. The attachment member 301 is secured to a shaft 303 which carries a flat friction disk 304 (Fig. 18). Rotatably disposed on shaft 303 is a bracket member 305 which carries a plurality of pins 306 which are spring pressed, by compression coil springs 307, into frictional engagement with disk 304. At its lower side the bracket 305 carries a depending arm 308, at opposite sides of which are attached the horizontal arms 309 and 310. Movable switch contact members 311 and 312 (Fig. 17) are slidably mounted on the arms 309 and 310, respectively, and are biased by compression coil springs 313 and 314, respectively, toward the outer ends of arms 309 and 310. Spaced fixed contacts 315 and 316, mounted at one side of the depending bracket arm 310, are adapted to be bridged by the movable contact 311 when bracket 305 is displaced clockwise in Fig. 17. Spaced fixed contacts 317 and 318, mounted at the opposite side of the depending bracket arm 310, are adapted to be bridged by the other movable contact 312 when bracket 305 is displaced counterclockwise in Fig. 17. When the driving motor 31 is driven in the forward direction, the shaft 303 is rotated in a direction to shift the bracket 305 (through the friction drive 304, 306) clockwise in Fig. 17 to position the movable contact 311 in engagement with the spaced fixed contacts 315 and 316 for completing a circuit therethrough. When the driving motor 31 is reversed, shaft 303 is correspondingly driven in the opposite direction to shift the bracket 305 (through the friction drive 304, 306) counterclockwise in Fig. 17 to position movable contact 312 in engagement with the spaced fixed contacts 317 and 318 for completing a circuit therethrough.

Figure 19:
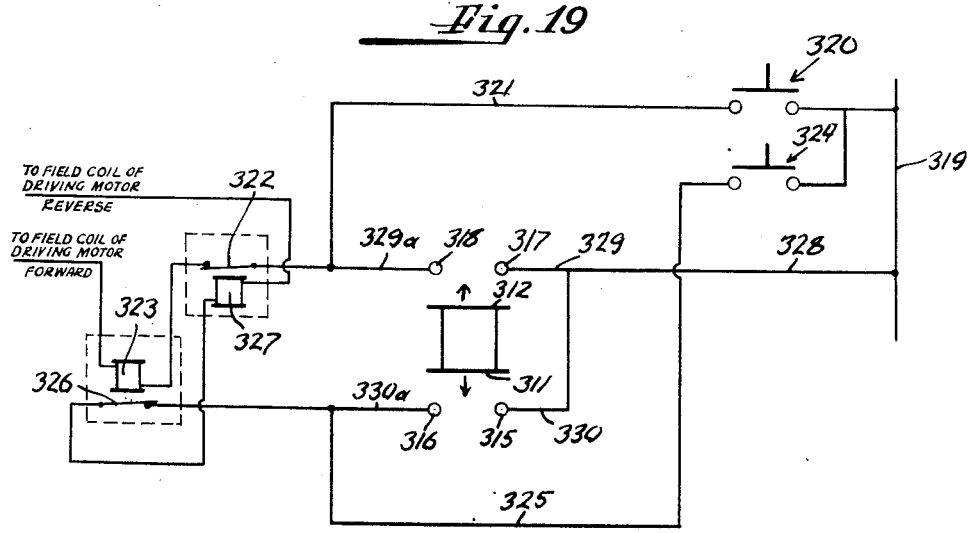
Fig. 19 is a fragmentary schematic circuit diagram illustrating the manner in which the plugger switch of Fig. 17 operates to stop the drive.

Referring to Fig. 19, the movable switch blades 311 and 312 respectively control the energization of the field coil for driving motor 31, so that when the motor is de-energized the circuit functions automatically to send opposing current through the field coil of the driving motor which opposes coacting of the motor armature in whatever direction it had been rotating, for stopping the motor substantially instantaneously.

In the Fig. 19 circuit, for energizing the field coil of the driving motor 31 to drive the motor in the forward direction from the line 319 there is provided the normally open "forward" push button switch 320, which may be an operator-controlled push-button switch or a limit switch responsive to the position of the work holder or tool holder being positioned, which controls the current to a line 321 leading to a normally closed switch 322 and thence through relay coil 323 to the field coil of the driving motor 31. Also, from line 319 a similar normally open "reverse" switch 324, for energizing the driving motor 31 in the reverse direction, controls the current to a line 325 leading to the normally closed switch 326 and thence through relay coil 327 to the field coil of the driving motor 31. Switch 326 is under the control of relay coil 323 such that energization of relay coil 323 opens switch 326. Switch 322 is under the control of relay coil 327 such that energization of relay coil 327 opens switch 322. Another line 328 leads from the line 319 and has a branch line 329 leading to the normally open contacts 317, 318 of the plugger switch and thence through line 329a to switch 322. Another branch line 330 leads to the normally open contacts 315, 316 of the plugger switch and thence through line 330a to switch 326.

In the operation of this mechanism, when the "forward" switch 320 is closed, the driving motor 31 is driven in the forward direction by current through line 321, switch 322 and relay coil 323. Energization of relay coil 323 opens the normally closed switch 326. Due to the forward direction of driving motor 31, the switch blade 311 carried by bracket 305 is positioned to bridge the contacts 315, 316. Then, when the "forward" switch 320 is opened to de-energize the driving motor 31, the relay coil 323 is de-energized substantially instantaneously to permit switch 326 to move to its normal closed position. Because of the coasting of the driving motor and the inertia of the drive to shaft 313, shaft 303 tends to continue rotating in the same direction to maintain switch blade 311 in engagement with contacts 315, 316 for a brief interval after switch 320 opens. During this brief interval, a circuit is completed from line 319 through lines 328 and 330, contact 315, switch blade 311, contact 316, line 330a, closed switch 326, and relay coil 327 to send reverse current to the field coil of the driving motor for braking the motor. Thereafter, bracket 305 drops to its neutral position (Fig. 17) and the motor is completely de-energized.

Conversely, when the "reverse" switch 324 is closed, the driving motor 31 is driven in the reverse direction by current through line 325, closed switch 326, and relay coil 327. Energization of relay coil 327 opens switch 322. Due to the reverse energization of the driving motor the switch blade 312 carried by bracket 305 is positioned to bridge the contacts 317, 318. Then, when the "reverse" switch 324 is opened to de-energize the driving motor the relay coil 327 is de-energized substantially instantaneously to permit switch 322 to move to its normal closed position. Because of the coasting of the driving motor after it is de-energized and the inertia of the drive to shaft 303, shaft 303 tends to continue rotating in the same direction to maintain switch blade 312 in engagement with contacts 317, 318 for a brief interval after switch 324 opens. During this brief interval, a circuit is completed from line 319 through lines 328 and 329, contact 317, switch blade 312, contact 318, line 329a, closed switch 322 and relay coil 323 to send opposing current to the field coil of the driving motor for braking the motor. Following this, bracket 305 returns to its neutral position and driving motor 31 is completely de-energized.

Drive for tool and work holders

The transmission shaft 141 (Fig. 3) between its bearings 158 and 159 carries a gear 200, keyed to the shaft. Gear 200 is in constant mesh with a gear 201 which is rotatably mounted on shaft 202 by means of a cylindrical bearing bushing 203. The gear 201 carries at one end a first set of clutch teeth 204 and at its opposite axial end another set of clutch teeth 205. The clutch teeth 204 are adapted, in one position of gear 201 axially along the shaft 202, to engage the clutch teeth 206 formed on the clutch member 207 which is keyed to a shaft 208 to be fixed longitudinally thereon and to rotate therewith. Shaft 208 extends away from the shaft 207 in axial alignment therewith and is rotatably supported by the ball bearing assembly 209 and a bearing bushing 210. At its opposite end the shaft 208 is keyed to a sleeve member 211, which is also keyed to a shaft 212 extending away from shaft 208 in axial alignment therewith. As best seen in Fig. 2, shaft 212 is connected by a conventional bevel gear arrangement at 213 in driving relation to a shaft 214, which is in driving relation at 215 with the lead screw 216 (Figure 1) of the vertically adjustable tool holder or head 23. Thus, when the clutch teeth 204 and 206 are in engagement, the lead screw 216 for the tool holder or head is driven from shaft 202.

Returning to Fig. 3, the clutch teeth 205 are adapted, in the opposite extreme axial position of the gear 201 along the shaft 202, to engage the clutch teeth 217, which are integral with a gear 218 rotatably mounted by means of a bearing bushing 219 on shaft 202. Shaft 202 is supported at its ends by a ball bearing assembly 220, mounted in an end wall 221 of the housing for transmission 133, and a ball bearing assembly 222 mounted in an axial recess formed in the clutch sleeve 207. The bearing bushings 203 and 219 abut against one another at their respective inner ends. At its outer end the bearing bushing 203 abuts against an enlarged transverse shoulder 223 formed on shaft 202. At its outer end the other bearing bushing 219 abuts against an annular end thrust washer 224, which in turn abuts against an end thrust bearing 225 seated against the ball bearing assembly 220. The gear 218 carried on shaft 202 meshes with a gear 226 keyed to the shaft 227. Shaft 227 is rotatably supported by spaced ball bearing assemblies 228 and 229 carried by the housing for transmission 133. Gear 226 in turn meshes with a gear 230 keyed to another shaft 231, which is rotatably supported by the spaced ball bearing assemblies 232 and 233. At one end the shaft 231 is splined to a sleeve 234, which in turn is splined to a shaft 235 on which is formed the lead screw 236 for the saddle. Thus, when the clutch teeth 205 and 217 are in engagement, the lead screw 236 for the work saddle is driven from the shaft 202.

For controlling the axial position of the gear 201, and thus the selective engagement of clutch teeth 204, 206 and 205, 217, the gear member 201 is formed with a reduced neck portion 237 for receiving a shifter 238 (Fig. 8). Shifter 238 is carried on a tubular member 239, which is fixedly secured at one end of a reciprocable tubular sleeve 240. A coil spring 239a provides a resilient lost-motion connection between the unitarily movable assembly of tubular member 239 and sleeve 240 and another tubular member 241, which is slidably disposed within the sleeve 240. The slidable member 241 is formed with a cloesd end 242 which normally abuts against an internal shoulder 243 formed on sleeve 240 intermediate its length. As best seen in Fig. 7, the outer sleeve 240 is formed with a slot 244 at its under side, through which the upper portion 245 of a lever 246 extends into the interior of the sleeve 240 immediately behind the internal shoulder 243 therein. One side of the upper portion 245 of lever 246 normally engages the closed end 242 of slidable sleeve 241, and at its opposite side the upper portion 245 of lever 246 normally engages the closed end 247 of another tubular member 248 slidably mounted within sleeve 240. A coil spring 249, which at one end engages an annular closure member 250 for one end of the sleeve 240, normally biases the slidable tubular member 248 into abutment against an internal shoulder 251 formed on the sleeve 240.

The lever 246 is keyed to shaft 252 (Fig. 7), which is rotatably mounted in the spaced ball bearing assemblies 253 and 254. By means of coupling members 255 and 256, shaft 252 is coupled to a shaft 257 attached to a lever arm 258 mounted at the front of the speed reduction unit 47 (see Figs. 1, 4 and 5).

Shaft 257 also carries a switch actuating member formed with arms 259 and 260, which extend above and below the shaft, respectively. A pair of precision snap-acting switches 261 and 262 (Fig. 5), both of which control the energization of the driving motor 31, are mounted with their respective plungers 263, 264 positioned to be engaged respectively by the aforementioned arms 259 and 260 carried on shaft 257. When lever 258 is moved angularly counterclockwise in Fig. 5 the arm 259 engages the plunger of switch 261 to energize the driving motor 31. Alternatively, when the lever 258 is moved clockwise in Fig. 5, the arm 260 engages the plunger of switch 262 to energize the driving motor. In the neutral position of lever 258 (shown in Fig. 5), both of the switches 261 and 262 are open and motor 31 is de-energized.

For releasably locking the lever 258 in any of its three positions (neutral, left for horizontal saddle control, and right for vertical head control), it is formed with an axial passage 265 which extends downward from its upper end and at the bottom of which a coil spring 266 is seated. A plunger 267 is slidably mounted in the passage 265, being formed with a knob 268 at its upper end disposed beyond the axial passage in lever 258 and bearing at its lower end against the coil spring 266. Intermediate its length the plunger 265 is formed with a reduced neck portion 269. The front wall portion 270 of the speed reduction unit housing at which lever 258 is mounted carries three angular members 271, which form seats for the ball 272. The ball 272 is located between the adjacent portion of plunger 267 and its annular seat at 271. Normally spring 266 biases the plunger 267 to an upward position where its enlarged lower end, below the reduced neck 269, bears against ball 272 to force the latter against its seat 271. In this manner, lever 258 is normally locked in its neutral position. However, when the plunger 267 is depressed against the force of spring 266, the reduced neck 269 on the plunger moves into alignment with ball 272 and the inward force urging ball 272 against its seat 271 is relieved, permitting the lever 258 to be displaced angularly in either direction about the axis of shaft 257. As best seen in Fig. 7, a fixed pin 273 extending into a slot 274 formed in lever 246 which is closed at each end limits angular movement of shaft 257 and lever 258 in either direction.

Figure 5:
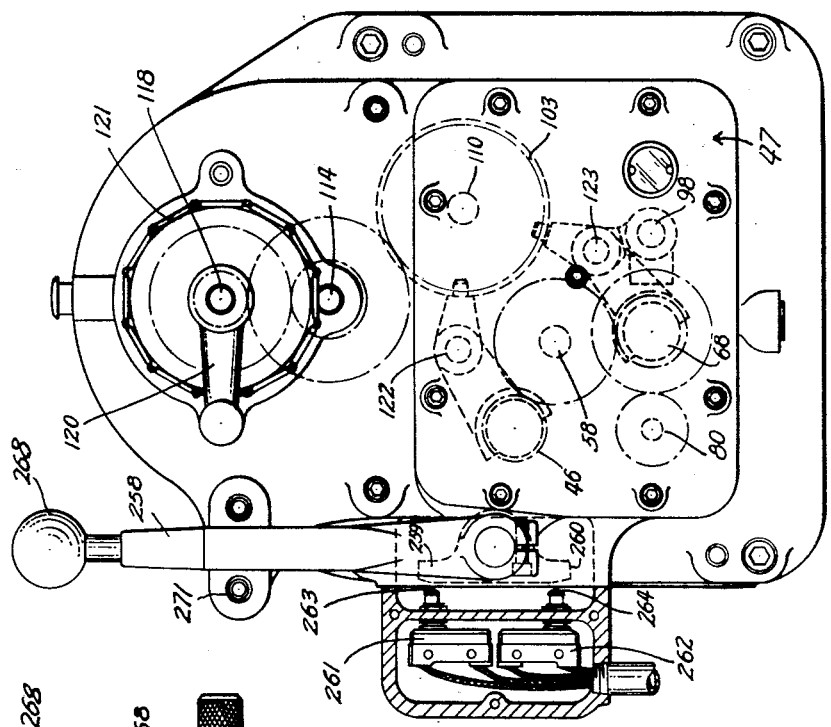
Fig. 5 is a front view of the device of Fig. 4.

In the operation of the manually controlled shifter 238, the lever 258 is normally maintained in its netural position, shown in Figs. 4, 5 and 7. Spring 266 forces the plunger 267 upward to hold the lever 258 frictionally in its neutral position, as described. The lever 246 mounted on shaft 257 has its upper end 245 extending directly upward between the spring-pressed, slidable members 241 and 248, so as to exert no force on either of these members tending to slide the same relative to the sleeve 240. The shifter 238 engages the reduced neck portion 237 on gear 201 to maintain the latter in its neutral position, with its clutch teeth 204 disengaged from the clutch teeth 206 and with its clutch teeth 205 disengaged from the clutch teeth 217.

To shift gear 201 along shaft 202 so as to have the clutch teeth 205 move into engagement with the clutch teeth 217, the plunger 267 is first depressed to unlock the lever 258 and then the latter is pivoted counter-clockwise in Fig. 5. The resulting angular movement of shaft 257 causes the upper end 245 of lever 246 to push the slidable member 241 against the spring 239a. Spring 239a in turn exerts a force against member 239 to move the sleeve 240 downward in Fig. 8. The gear member 201 is slid by shifter 238 along the bearing bushing 203 to move the clutch teeth 205 into engagement with the clutch teeth 217. This movement of the lever 258 also closes switch 261 to energize the driving motor 31.

To shift gear 201 from its neutral position along shaft 202 so as to have the clutch teeth 204 move into engagement with the clutch teeth 206, the plunger 267 is depressed to unlock lever 258 and the latter is pivoted clockwise in Fig. 5. The resulting angular movement of shaft 257 causes the upper end 245 of lever 246 to push the slidable member 248 against coil spring 249. Spring 249 acts against plug member 250 to move sleeve 240 upward in Fig. 8. This movement of sleeve 240 moves the shifter 238 in the same direction, to slide the gear 201 along bearing bushing 203 to move the clutch teeth 204 into engagement with the clutch teeth 206. This angular movement of lever 258 also closes switch 262 to energize the driving motor 31.

Hand feed

In order to provide for manually controlled feed movement of the saddle 26, the shaft 227 (Fig. 3) carries a bevel gear 280 keyed to it immediately adjacent the ball bearing assembly 228. As best seen in Fig. 10, a bevel gear 281 meshing with bevel gear 280 for driving the latter is keyed to a rotary shaft 282, which is rotatably supported in the spaced roller bearing assemblies 283 and 284. At its opposite end, the shaft 282 extends through a face plate 285 and carries a clutch member 286 formed with clutch teeth 287 thereat. Beyond the clutch member 286, the shaft 282 is formed with a circumferential groove 288. A crank assembly, indicated generally at 296a, includes a tubular sleeve 289, mounted on a bushing 290, carries at its inner end clutch teeth 291 adapted to engage the clutch teeth 286. A coil spring 292, located between an end cap 293 at the opposite end of the sleeve 289 and a cup-shaped member 294 abutting against the outer end of shaft 282, normally biases sleeve 289 outward along shaft 282 to position the clutch teeth 291 thereon away from engagement with the teeth 287 on the clutch member 286 attached to shaft 282. A spring-pressed plunger 295 is normally seated in the circumferential groove 288 to maintain the sleeve 289 in this position. A crank handle 296 is rigidly attached to sleeve 289.

From the foregoing, it will be seen that the crank handle 296 normally has no driving connection to shaft 282. When it is desired to establish such a driving connection, the crank handle 296 is pushed inwardly against the force of compression spring 292, causing the plunger 295 to be retracted out of the way of the sleeve 289 and moving the clutch teeth 291 on sleeve 289 into engagement with the clutch teeth 287 on the clutch sleeve 286 attached to shaft 282. With this driving connection established, the crank handle 296 may be turned to rotate the bevel gear 281 mounted on shaft 282. Bevel gear 281 meshes with bevel gear 280 to drive the shaft 227. Shaft 227, by the meshing of its gear 226 with the gear 230 mounted on shaft 231, drives the lead screw 236 for the saddle 26. This manually-controlled feed movement of the saddle of course is accomplished when the hand lever 258 for motor-driven operation of the saddle is in its neutral position.

For manually controlling the feed movement of the work holder, a similar crank mechanism 297 (Fig. 2) is similarly selectively clutched to a shaft 298, which has a similar bevel gear driving connection to the shaft 212. Thus, the feed screw 216 for the tool holder or head 23 may be driven manually from the manual crank 297.

While in the foregoing description there is disclosed a specific preferred embodiment of the present invention, it is to be understood that various modifications, omissions and refinements which depart from the described form of the invention may be adopted without department from the spirit and scope of the invention.

I claim:
1. Transmission mechanism of the character described including a drive motor and mechanism driven thereby for transmitting feed and rapid movements, and a control for said mechanism including a first switch operable when closed to complete a circuit to the field coil of the driving motor for energizing the driving motor in one direction, a second switch operable to control another normally open circuit to the field coil of the driving motor, said other circuit being operative when closed to send opposing current through the field coil of the driving motor, friction drive means interposed between said transmission and said second switch operative in response to the driving of said transmission in one direction by the driving motor to position said second switch for completing a portion of said other circuit to the field coil of the driving motor, and means responsive to the opening of the first switch for closing said normally open other circuit to the field coil of the driving motor through said second switch for braking the driving motor when the latter is de-energized.

2. Transmission mechanism for moving a work holder or a tool holder in a machine tool or the like comprising, in combination, a driving motor, a lead screw, a transmission interposed between said driving motor and said lead screw providing a driving connection therebetween, said transmission including a shaft splined longitudinally for a portion of its extent, a shiftable clutch member splined to said splined shaft portion and slidable longitudinally therealong, a sleeve member slidably mounted on said shaft and abutting against one end of said shiftable clutch member, a fixed clutch member rotatable along said shaft, said fixed clutch member being formed with a plurality of clutch teeth at its end adjacent to said shiftable clutch member, said shiftable clutch member being formed with a plurality of clutch teeth at its end adjacent to said fixed clutch member adapted to engage said clutch teeth thereon to form a hard clutch drive from said fixed clutch member to said shaft, said fixed clutch member carrying a gear driven from said motor, spring means biasing said shiftable clutch member axially along said shaft into engagement with said fixed clutch member, a housing member freely rotatably mounted with respect to said shaft and driven from said motor independent of said gear drive from the motor, and friction clutch means located between said housing member and said shiftable clutch member, said shiftable clutch member being operative when shifted axially along said shaft away from said fixed clutch member to engage said friction clutch means and establish a friction drive from said housing member to said shaft.

3. The mechanism of claim 2, including a piston movable axially of said shaft and abutting against the end of said sleeve member away from said shiftable clutch member, a cylinder in which said piston operates, an oil reservoir, conduit means communicating between said reservoir and said cylinder at the end of said piston away from its engagement with said sleeve member, a pump driven from said housing member interposed between said reservoir and said cylinder behind the slidable sleeve for pumping oil from said reservoir to said cylinder, and a valve controlling the passage of oil from said reservoir to said cylinder, said valve being operative in one position to direct oil under pressure behind the piston to displace the piston, the sleeve member and the slidable clutch member along said shaft against the urging of said spring means to have the slidable clutch member engage said friction clutch means to establish a friction drive from the motor through said housing member to said shaft, said valve being operative in another position to relieve the oil pressure from behind said slidable clutch member to permit the latter to be biased by said spring means into engagement with said fixed clutch member to establish a hard clutch drive from the motor through said fixed and slidable clutch members to said shaft.

4. Transmission mechanism for moving a work holder or a tool holder in a machine tool or the like comprising, in combination, a driving motor, a lead screw, a transmission interposed between said driving motor and said lead screw including a speed reduction unit, shiftable clutch means in said transmission including a friction type clutch and a jaw type clutch, said clutch means being operative in one position to engage said friction type clutch to establish a friction drive thereto from the motor independent of said speed reduction unit for the rapid movement of the lead screw and operative in another position to engage said jaw type clutch to establish a hard clutch drive from the motor through said speed reduction unit for the slow feed movement of the lead screw, and manually controlled means operative to control the speed setting of said speed reduction unit for selectively determining the output speed therefrom to said transmission, said speed reduction unit including a plurality of axially fixed, rotatable gears and a plurality of axially shiftable, rotatable gears, and said manully controlled means including an angularly movable roller formed with peripheral cam grooves, said shiftable gears being interconnected with said cam grooves to be shifted axially upon angular turning of the roller to move into and out of mesh with said fixed gears, whereby the angular position of the roller determines the drive through the gear reduction unit.

5. Transmission mechanism of the character described comprising a main shaft splined longitudinally for a portion of its length, a shiftable clutch member splined to said splined shaft portion and slidable longitudinally thereon, a sleeve member slidably mounted on said main shaft and abutting against one end of said shiftable clutch member, a worm gear coaxial with said slidable sleeve member and mounted to rotate with respect thereto, a worm in mesh with said worm gear, change speed mechanism for transmitting feed speeds to the worm gear, said worm gear and said shiftable clutch member each having clutch teeth engageable by shifting said clutch member to establish a hard clutch drive from said worm gear to said main shaft, spring means biasing said shiftable clutch member axially along said main shaft to engage said clutch teeth, a housing body coaxial with said main shaft and rotatable about said shiftable clutch member, means for driving said housing body at a rapid rate, and friction clutch means interposed between said housing body and said shiftable clutch member and arranged to establish a soft action clutching engagement of said friction clutch means between said housing body and said main shaft by axial movement of said shiftable clutch member.

6. Transmission mechanism as set forth in claim 5, in which said soft action clutching engagement is established by movement of the shiftable clutch member against the biasing action of the spring means.

7. Transmission mechanism as set forth in claim 5, in which the housing body is shaped and arranged to rotate about the shiftable clutch member and also the spring means, and in which the spring means consists of a coil compression spring around the main shaft engaging the shiftable clutch member at its end opposite from its clutch teeth end.

8. Transmission mechanism as set forth in claim 5, in which the splined portion of the main shaft is at one end of said shaft and located within the housing body, and in which the housing body is mounted on its exterior for rotation in a main supporting bearing and the said end of the main shaft is mounted for bearing support within and upon the housing body.

9. Transmission mechanism for moving a work holder or a tool holder in a machine tool or the like comprising, in combination, a driving motor, a lead screw, a transmission interposed between said driving motor and said lead screw including speed reduction means, shiftable clutch means in said transmission including a friction type clutch and a jaw type clutch, said clutch means being operative in one position to engage said friction type clutch to establish a friction drive thereto from the motor independent of said speed reduction means for the rapid movement of the lead screw and operative in another position to engage said jaw type clutch to establish a hard clutch drive from the motor through said speed reduction means for the slow feed movement of the lead screw, and switch means for controlling said driving motor in coaction with said shiftable clutch means, said switch means being actuated to one position responsive to the driving of said transmission in one direction from the driving motor and operative in said position upon de-energization of the driving motor to send opposing current to the driving motor to brake the latter substantially immediately when the driving motor is de-energized.

10. Transmission mechanism for moving a work holder or a tool holder in a machine tool or the like comprising, in combination, a driving motor, a lead screw, a transmission interposed between said driving motor and said lead screw including speed reduction means, shiftable clutch means in said transmission including a friction type clutch and a jaw type clutch, said clutch means being operative in one position to engage said friction type clutch to establish a friction drive thereto from the motor independent of said speed reduction means for the rapid movement of the lead screw and operative in another position to engage said jaw type clutch to establish a hard clutch drive from the motor through said speed reduction means for the slow feed movement of the lead screw, and switch means for controlling said driving motor in coaction with said shiftable clutch means, said switch means including a first switch operable when closed to complete a circuit to the field coil of the driving motor for energizing the driving motor in one direction, a second switch operable to control another normally open circuit to the field coil of the driving motor, said other circuit being operative when closed to send opposing current through the field coil of the driving motor, friction drive means interposed between said transmission and said second switch operative in response to the driving of said transmission in one direction by the driving motor to position said second switch for completing a portion of said other circuit to the field coil of the driving motor, and means responsive to the opening of said first switch for closing said normally open other circuit to the field coil of the driving motor through said second switch for braking the driving motor when the latter is de-energized.

11. Transmission mechanism for transmitting rapid traverse and feed movements in a machine tool or the like comprising, in combination, a driving motor, a lead screw, a transmission interposed between said driving motor and said lead screw providing a driving connection therebetween and including a speed reduction unit for transmitting feed speeds, said transmission including a main shaft splined longitudinally for a portion of its length, a shiftable clutch member splined to said splined shaft portion and slidable longitudinally thereon, a sleeve member slidably mounted on said main shaft and abutting against one end of said shiftable clutch member, a worm gear coaxial with said slidable sleeve member and mounted to rotate with respect thereto, a worm in mesh with said worm gear and driven from said speed reduction unit, said worm gear and said shiftable clutch member each having clutch teeth engageable by axially shifting said clutch member to establish a hard clutch drive from said worm gear to said main shaft, spring means biasing said shiftable clutch member axially along said main shaft to engage said clutch teeth, a housing body coaxial with said main shaft and rotatable about said shiftable clutch member, means for driving said housing body from said motor at a rapid rate, a friction clutch means interposed between said housing body and said shiftable clutch member and arranged to establish a soft action clutch engagement of said friction clutch means between said housing body and said main shaft by axial movement of said shiftable clutch member, and clutch operating means acting against the end of the sleeve member opposite from said shiftable clutch member and operable in control movements axially of said main shaft to effect said clutch engagements, respectively.

12. Transmission mechanism as set forth in claim 11, in which the clutch operating means includes a piston moveable axially of the main shaft and abutting against the described end of the sleeve member to effect the clutch engagements by said axial movement, a cylinder in which said piston operates, an oil reservoir, conduit means communicating between said reservoir and said cylinder at the end of said piston away from its engagement with said sleeve member, a pump for pumping fluid from said reservoir to said cylinder, and valve means controlling the passage of fluid to said cylinder, said valve means being operable in one position to direct said fluid under pressure behind the piston to displace the piston, the sleeve member and the slidable clutch member axially of the main shaft against the bias of said spring means to cause the slidable clutch member and the friction clutch means to establish a friction drive from the motor through the housing body to said main shaft.

References Cited in the file of this patent

UNITED STATES PATENTS

| Number | Name | Date |
|---|---|---|
| 2,363,934 | Bennett | Nov. 28, 1944 |
| 2,449,223 | Hayman | Sept. 14, 1948 |
| 2,482,954 | Weiss | Sept. 27, 1949 |
| 2,493,299 | LeBlond et al. | Jan. 3, 1950 |
| 2,506,645 | Kellogg et al. | May 9, 1950 |
| 2,566,210 | Kendall et al. | Aug. 28, 1951 |
| 2,595,580 | Hill | May 6, 1952 |